Feb. 17, 1942.   G. V. RYLSKY   2,273,596
DIRECT CURRENT REMOTE INDICATING SYSTEM
Filed Oct. 28, 1940   2 Sheets-Sheet 1
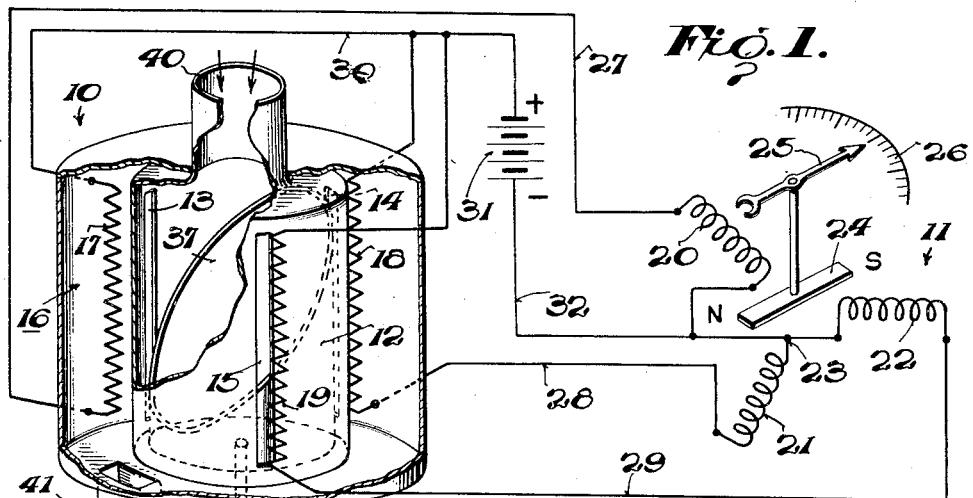
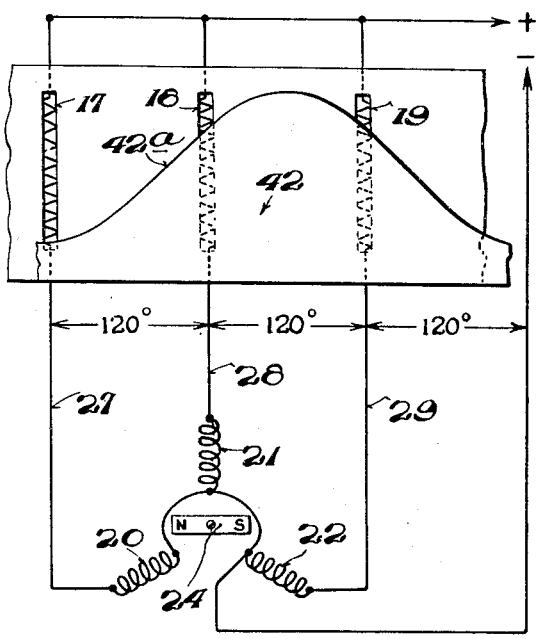
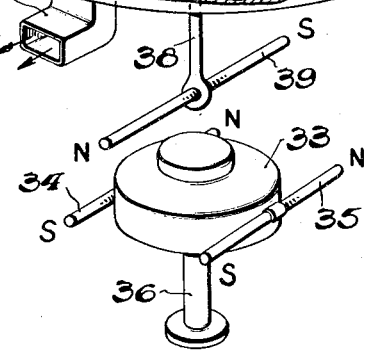
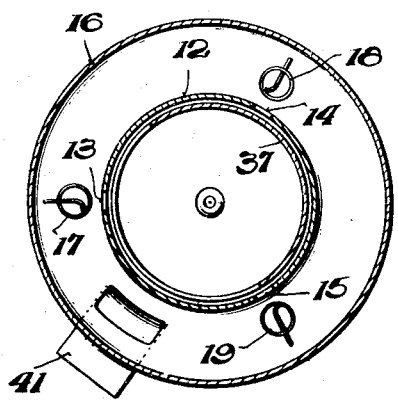
INVENTOR
*Gregory V. Rylsky*
BY
*Cerstvrk + Kalman*
ATTORNEYS Feb. 17, 1942.　　　　G. V. RYLSKY　　　　2,273,596
DIRECT CURRENT REMOTE INDICATING SYSTEM
Filed Oct. 28, 1940　　　　2 Sheets-Sheet 2
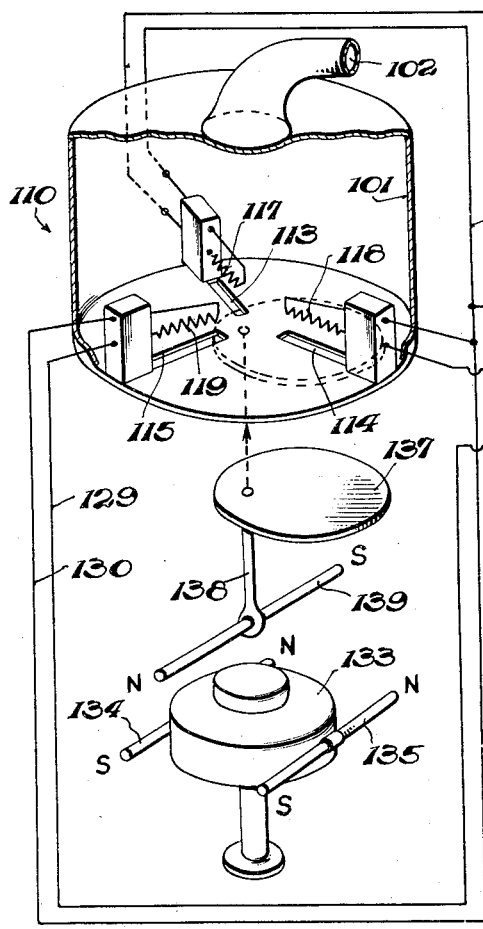
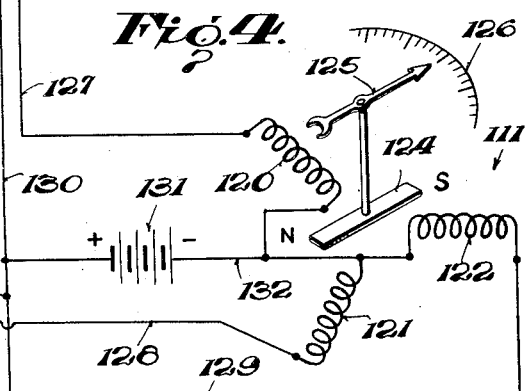
Fig. 4.
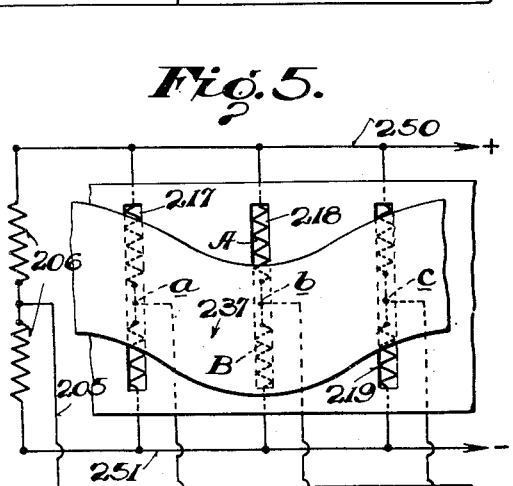
Fig. 5.
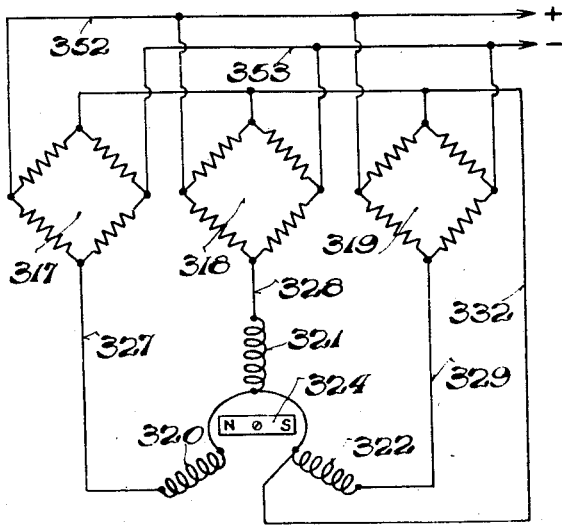
Fig. 6.
INVENTOR
Gregory V. Rylsky.
BY
Cerstvik + Kalman
ATTORNEYS Patented Feb. 17, 1942

2,273,596

UNITED STATES PATENT OFFICE 2,273,596

DIRECT CURRENT REMOTE INDICATING SYSTEM

Gregory V. Rylsky, New York, N. Y., assignor to Bendix Aviation Corporation, Bendix, N. J., a corporation of Delaware Application October 28, 1940, Serial No. 363,231

12 Claims. (Cl. 177—351)

This invention relates to remote indicating systems of the type wherein a local minute movement of a sensitive instrument may be accurately and rapidly reproduced at a remote or distant point.

It has been the general practice in the past to provide "Autosyn" or "Selsyn" systems for reproducing indications at a remote point. In the use of these systems the initial movement has to be of a substantial value so as to move the transmitter rotor of the system and at the same time overcome the reactive forces set up by the moving transmitter rotor. Obviously, such systems are impractical and undependable when it is desired to transmit the small movements of sensitive instruments such as magnetic or gyroscopic compasses generally provided upon aeroplanes or seagoing vessels.

The reason for the inadaptability of the present systems known in the telemetric art lies in that any attempt to connect a transmitter rotor to a movable element of a sensitive instrument providing a small torque would result in relative movement between the rotor and the element or, it may even be that the reactive force upon the rotor would be great enough to prevent movement of the element.

One of the objects of the present invention is to provide a novel remote indicating system for overcoming the above-mentioned difficulties and, further, one adapted to accurately and rapidly reproduce at a remote point minute movements of sensitive instruments such as compasses, for example, which generate a very small torque during their movement. It is specifically to be understood, however, that the invention is not limited to use with compasses only, but may be used as well to reproduce movements of gyroscopic and other sensitive instruments.

Another object is to provide a novel remote indicating system of the direct current type for amplifying and transmitting very small torques so as to accurately reproduce movements of sensitive instruments at a remote point.

A further object is to provide a novel remote indicating system of the type described whereby small torques generated by sensitive instruments will be accurately reproduced at a remote point without disturbing the indications of the sending instrument due to any reactive torques thereon.

A still further object is to provide a novel remote indicating mechanism of the character above described adapted to be energized by direct current, thereby eliminating the necessity of a special source of alternating current and thus cutting down considerably the weight of the mechanism.

A further object of the invention is to provide a novel remote indicating system having a transmitter provided with temperature responsive resistors, whereby currents in the transmitter are varied as a function of the movement of a sensitive instrument, and the varying currents are communicated to the stator of a repeater setting up a resultant magnetic field in the stator thereby moving a pointer attached to an element movable with the resultant magnetic field. The follow-up movement of the element at the repeater produces a remote indication of the movement of the sensitive instrument.

Another object of the invention is to provide in a remote indicating system of the type above described, a novel transmitter provided with temperature responsive elements in combination with a member movable with the movable element of a sensitive instrument for effecting temperature variation of the temperature responsive elements thereby varying current flow in a circuit at a remote point.

The above and further objects and novel features will more fully appear from the following detailed description when the same is read in connection with the accompanying drawings. It is to be expressly understood, however, that the drawings are for purposes of illustration only and are not intended as a definition of the limits of the invention, reference for this latter purpose being had primarily to the appended claims.

In the drawings, wherein like reference characters refer to like parts throughout the several views:

Figure 1 is a front view in section, partially diagrammatic, of one embodiment of the invention;

Figure 2 is a top elevation, with the top removed, of the novel transmitter disclosed in Figure 1;

Figure 3 is a developed view of the movable member of the transmitter of Figure 1, in relation to the transmitter and repeater circuits;

Figure 4 is a front view in section, partially diagrammatic, of another embodiment of the invention;

Figure 5 is a developed view of another form of the movable transmitter member of Figure 1, in relation to a second arrangement of the circuit embodying the temperature responsive elements; and Figure 6 is a wiring diagram of a further embodiment of the novel transmitter circuit arrangement of the invention.

In the embodiment illustrated in Figure 1, the remote indicating system is shown as comprising a transmitter device and a receiver device, generally designated at 10 and 11, respectively. The novel transmitter device 10 includes a cylindrical housing 12 provided with longitudinal slots 13, 14 and 15 in the cylindrical surface thereof and spaced 120° apart from each other. Surrounding the housing 12 is a second cylindrical housing 16 adapted to rigidly support three temperature responsive elements or resistors 17, 18 and 19 likewise spaced 120° apart outside the outer periphery of housing 12 and substantially adjacent the slots 13, 14 and 15 thereof for a purpose to be more fully described hereinafter.

The remote receiver device 11 includes a stator comprising coils 20, 21 and 22 joined at a common point 23. Suitably mounted with the receiver stator for rotation thereby is a magnetic rotor element 24 having attached thereto a pointer 25 superimposed for movement over a suitable scale 26.

The temperature responsive resistors 17, 18 and 19 are arranged in parallel in the circuit, as better shown in Figure 3, and one end of each of the resistors 17, 18 and 19 is connected to coils 20, 21 and 22 by means of conductors 27, 28 and 29, respectively. The opposite ends of the resistors are connected by way of a common lead 30 to one side of a suitable direct current supply source, such as a battery 31, while the common point 23 of the receiver coils is connected with the other side of the supply source by way of a conductor 32, thereby completing the circuit.

A sensitive instrument of any well known type, such as a magnetic compass 33 having magnets 34 and 35, for example, may be rigidly secured in any suitable manner by way of a rotatable support 36 to a craft at a point of minimum magnetic disturbance. As the craft utilizing the above described remote indicating system deviates from a predetermined course, the magnets 34 and 35 of compass 33 move angularly relatively to the craft so as to indicate at all times the direction of the magnetic north.

It is the relative angular movement of the compass magnets that it is desired to reproduce at a remote point, and this is accomplished by providing a magnetic coupling between the compass magnets and the transmitter rotor to be more fully described hereinbelow.

The transmitter rotor comprises a rotatably mounted vane 37 constituting a truncated hollow cylinder as shown in Figure 1. The rotor vane 37 is mounted within the housing 12 having its outer surface closely adjacent the inner periphery of the housing 12 and variably covering the slots 13, 14 and 15 as better shown in Figure 2. A shaft 38 suitably mounted for rotation in housings 12 and 16 is secured to the base of the rotor vane 37 for angularly moving the latter in response to compass movement by way of a follower magnet 39 suitably secured to the free end of shaft 38. The rotation of shaft 38 and vane 37 is effected by way of the follower magnet 39 which tends at all times to maintain a predetermined angular position with respect to the compass magnets 34 and 35.

A stream of air, which may be cooled, is led into the interior of the housing 12 from any suitable supply source (not shown) by way of inlet 40 formed integrally with or secured to the top of housing 12. The rotor vane 37 acts as a valve for directing the air into the unobstructed slot thereby cooling the related resistor adjacent the slot and at the same time preventing air flow to the slots covered by the vane. The air passes over the resistor to the interior of housing 16 and is led therefrom by means of a suitable outlet 41. It is to be understood, however, that instead of a stream of cool air, the system will operate equally as well where a negative pressure or vacuum is used.

In operation, as the craft departs from a predetermined course, the compass magnets 34 and 35 move relatively with respect to the craft and since the transmitter device 10 is fixedly secured with the craft, the rotor vane 37 thereof is moved angularly an amount proportional to the compass movement due to the movement of the follower magnet 39 in keeping its predetermined angular relation with respect to the compass magnets.

Upon movement of the transmitter rotor vane 37, to the position shown in Figure 1, for example, the stream of cool air will be prevented from passing to slots 14 and 15 but is directed to pass through slot 13 and over resistor 17, cooling the latter, thereby increasing the current flow therein and in related coil 20. Since the resistance of resistors 18 and 19 remains constant and in this case greater than that of resistor 17, smaller currents flow therethrough and, therefore, in coils 21 and 22.

As is well known, magnetic fields are set up about a conductor carrying a current and, therefore, the magnetic fields surrounding coils 21 and 22 will be substantially equal and of smaller intensity than the magnetic field surrounding coil 20 having the greater current flow. The resultant magnetic field, therefore, will be greater about coil 20 and the magnetic pull exerted thereby upon magnet 24 will cause movement thereof and of pointer 25 over scale 26. The pointer 25, therefore, is moved angularly into positional agreement with the direction of the compass magnets 34 and 35.

Upon further rotation of vane 37 due to additional craft deviation another resistor is uncovered while the remaining two are covered and the cool air impinges upon the uncovered resistor thereby decreasing the value of its resistance and increasing current flow therethrough. This current change is communicated in the same manner to the related coil and the direction of the resultant magnetic field changes thereby angularly moving the receiver rotor 24 and pointer 25 to a new positional agreement.

The action of the vane 37 upon the resistors 17, 18 and 19 may be better understood upon reference to Figure 3, wherein 42 represents a development of the vane 37 with the relation of its effective edge 42a to the resistors 17, 18 and 19.

From the above, it will now be apparent to those skilled in the art that a novel remote indicating system has been provided for remotely indicating small movements of a sensitive instrument without the necessity of any mechanical connection between the movable sensitive element and the transmitter rotor.

Similar to the arrangement shown in Figure 1, but differing chiefly therefrom in the transmitter rotor vane, a second embodiment of the invention is shown in Figure 4. Like parts in this view similar to parts in Figure 1 are designated with the same reference numeral plus 100.

The arrangement of Figure 4 consists chiefly of a transmitter device 110 and a receiver device 111. The transmitter 110 is provided with a cylindrical housing 101 having an outlet 102 secured thereto or formed integrally therewith while the base of the cylinder is provided with slots 113, 114 and 115. Rigidly mounted within the housing 101 upon suitable supports closely adjacent the slots 113, 114 and 115 are the temperature responsive resistors 117, 118 and 119.

The receiver device 111 comprises stator coils 120, 121 and 122 which are connected at one end to a common lead 132 and have their free ends connected to one of each of the temperature responsive resistors 117, 118 and 119, respectively, by means of leads 127, 128 and 129. The temperature responsive resistors are arranged in parallel and have their free ends connected by means of lead 130 with one end of a suitable direct current supply source 131 while the other end of the source is connected with the common lead 132 to the coils. The stator coils 120, 121 and 122 are provided with a magnetic rotor member 124 carrying a pointer 125 movable over a scale 126.

A compass 133 suitably mounted upon the craft is provided with magnets 134 and 135 adapted for relative movement with respect to the craft during deviation of the latter from a predetermined course. Following the relative movements of the compass magnets 134 and 135, is a follower magnet 139 secured to one end of a shaft 138 carrying at the other end thereof an eccentrically mounted disc 137 which is adapted to pass over the slots 113, 114 and 115 as better shown in Figure 4. Since the transmitter device 110 is fixedly secured with the craft during course deviation of the craft, the follower magnet 139 will follow the relative movements of the compass magnets 134 and 135 and thereby rotate the vane 137 to a position such, for example, as shown in dotted lines in Figure 4. Assuming the outlet 102 to be secured with a source of vacuum, the slot 113 being unobstructed, the resistor 117 will be cooled and the current flow therein increased, increasing current flow in coil 120 whereby the resultant magnetic field formed about the coils will carry rotor member 124 and pointer 125 to positional agreement with the compass magnets 134 and 135. The action here is substantially identical to that described in connection with the arrangement of Figure 1 and will now be apparent to those skilled in the art.

It is to be noted that in the arrangement of Figures 1 to 4, inclusive, only the resultant magnetic field surrounding the coils has been relied upon, and this for the reason that current flows in the same direction at all times within the coils. A second arrangement can be utilized wherein the direction of flow of current is varied, thereby varying the direction of the magnetic field surrounding the coils. For this arrangement, reference is made to Figure 5 of the drawings, wherein, parts similar to like parts in Figure 1 have been designated with the same reference numeral plus 200.

The transmitter arrangement provided with the resistor circuit of Figure 5 is substantially the same as the transmitter arrangement of Figure 1 with the exception that the temperature responsive resistors 217, 218 and 219 are tapped at their midpoints, a, b and c, respectively, and joined at such points with coils 220, 221 and 222 by way of conductors 227, 228 and 229. The temperature responsive resistors are arranged in parallel in the circuit and have their free ends connected with a suitable supply source and with an additional resistor 206 by means of common leads 250 and 251. The free ends of the coils, in this case, are joined to the midpoint of resistor 206 by way of lead 205.

The temperature responsive resistors 217, 218 and 219 are spaced 120° apart about the inner housing 12 of Figure 1, containing slots 13, 14 and 15 and the rotor vane 37 is replaced with a rotor vane 237 having the development better shown in Figure 5, whose base contour is similar to and parallel with the contour of its top portion defining the edge 42a of Figure 3.

The operation of this arrangement is the same as that of Figure 1 with the exception that in the arrangement of Figure 5, current flow in the coils is reversed thereby reversing the polarity of the magnetic field surrounding the coils. This current reversal is accomplished by movement of the rotor vane 237 which cools one of the resistors at one side of the midpoint and at the next interval covers the former portion of the resistor and uncovers the opposite side of the resistor. Assuming that each of the resistors 217 and 219 are equally cooled at both sides of the midpoint while the value of resistor 218 is substantially decreased at one side of its midpoint due to greater cooling thereof as shown in Figure 5, and further, assuming a 100 volt supply source, the voltage at the midpoint of resistor 206 would be 50 volts. Since the value of resistor 218 has been decreased the voltage drop would be smaller and the voltage at the midpoint of resistor 218 would be substantially 65 volts. Current flow from the source would, therefore, be in the direction of the coil 221 and to the midpoint of resistor 206. The magnetic field generated about coil 221 would have one direction. Consider now, the reverse of the above, namely, that the upper portion A of resistor 218 were covered and the lower portion B uncovered and, therefore, cooled. Theoretically, if the resistor portion B were cooled to the point where the amount of resistance were negligible, the voltage at the midpoint would be zero and since the voltage at the midpoint of resistor 206 remains 50 volts, the current flow would be in the direction opposite from that discussed above, and the magnetic field surrounding coil 221 would be reversed. The field reversal is effective to pull the magnet rotor 224 to a position in agreement with the sensitive element acting upon the transmitter rotor. It is considered that the operation and function of the arrangement will now readily appear to those skilled in the art.

An arrangement substantially similar in function and operation to that of Figure 5, is that shown in Figure 6. The temperature responsive elements 217, 218 and 219 are replaced with Wheatstone bridge arrangements 317, 318 and 319 likewise subjected to varying temperature control. One diagonal of each of the bridges is connected at one end to each of the coils 320, 321 and 322 and at the other end to the free ends of the coils by means of leads 327, 328 and 329, respectively, and lead 332, while the opposite diagonal of each of the bridges is secured with two sides of a D. C. supply source by way of conductors 352 and 353. Opposite arms of the bridges 317, 318 and 319 are subjected to the movement of vane 237 of Figure 5 and the operation is similar to that described in connection with Figure 5 and the magnetic rotor element 324 is positioned into agreement with the sensitive element.

Although several embodiments of the present invention have been illustrated and described in detail, it is to be expressly understood that the invention is not limited thereto. Various changes may be made in the design and arrangement of the parts without departing from the spirit and scope of the invention as the same will be understood by those skilled in the art. For a definition of the limits of the invention, reference is therefore to be had to the appended claims.

What is claimed is:

1. In a system for indicating angular motion of a movable element of a sensitive instrument at a remote repeater, a transmitter device electrically connected with said repeater comprising a circuit having a plurality of temperature responsive resistors arranged in parallel in the circuit, a source of current for heating said resistors, means directing a flow of air to said resistors, air flow control means rotatably mounted adjacent said resistors, and magnetic means operatively connecting said control means for angular movement with said element whereby said control means are actuated for controlling the flow of air to said resistors to vary the temperature of said resistors in accordance with the angular movement of said element.

2. In a system for indicating angular motion of a movable element of a sensitive instrument at a remote repeater, a transmitter device electrically connected with said repeater comprising a circuit having a plurality of temperature responsive resistors arranged in parallel in the circuit, and a source of current for energizing said resistors to heat them, means for supplying air to vary the temperature of said resistors, a rotatably mounted valve adjacent said resistors for controlling said air supply, and magnetic means secured with said valve adapted for angular movement with said element whereby said valve is actuated to vary the temperature of said resistors and current flow therein in accordance with the angular movement of said element.

3. In a system for indicating angular motion of a movable element of a sensitive instrument at a remote repeater, a transmitter device electrically connected with said repeater comprising a circuit having a plurality of temperature responsive resistors arranged in parallel in the circuit and a source of current for energizing said resistors to heat them, means for supplying air to vary the temperature of said resistors, a truncated cylindrical member rotatably mounted adjacent said resistors for controlling said air supply, and magnetic means connected to said member whereby said member is actuated to vary the temperature of said resistors and current flow therein in accordance with the angular movement of said element.

4. A transmitter device for a remote indicating system of the type described comprising a plurality of temperature responsive resistors arranged in parallel and having current flow therein, means provided with a plurality of slotted portions arranged adjacent said resistors, a source of fluid pressure whose temperature differs from that of the temperature responsive resistors directed toward said slotted portions, and rotatably mounted means intercepting the fluid flow from passing through some of said slotted portions and directing said flow to pass through the remainder of said slotted portions to impinge upon the related resistors adjacent thereto thereby varying the temperature of said last-named resistors and the current flow therein.

5. A transmitter device for a remote indicating system of the type described comprising a plurality of temperature responsive resistors arranged in parallel and having current flow therein, means provided with a plurality of slotted portions arranged adjacent said resistors, a source of fluid pressure whose temperature differs from that of the temperature responsive resistors directed toward said slotted portions, and a rotatably mounted truncated cylindrical member for intercepting the fluid flow from passing through some of said slotted portions and directing said fluid flow to pass through the remainder of said slotted portions to impinge upon the related resistors adjacent thereto thereby varying the temperature of said last-named resistors and the current flow therein.

6. In a system for indicating angular motion of a movable element of a sensitive instrument at a remote repeater, a transmitter device comprising a plurality of temperature responsive resistors arranged in parallel and electrically connected at their midpoints with the repeater and having current flow therein, a rotatably mounted member adjacent said resistors for covering a portion of some of said resistors during one position of said movable element and for covering another portion of said last-named resistors during another position of said movable element whereby current flow communicated to portions of said repeater is reversed, and magnetic means secured with said rotatably mounted member adapted for angular movement with said sensitive element whereby said member is actuated for varying the temperature of said resistors and current flow therein in accordance with the angular movement of said sensitive element.

7. In a system for indicating angular motion of a movable element of a sensitive instrument at a remote repeater, a transmitter device comprising a plurality of temperature responsive resistors arranged in parallel and electrically connected at their midpoints with the repeater and having current flow therein, a source of fluid pressure whose temperature differs from that of the normal temperature of said temperature responsive resistors, a rotatably mounted member adjacent said resistors for directing said fluid against a portion of some of said resistors during one position of said movable element and for directing said fluid against another portion of said last-named resistors during another position of said movable element whereby current flow communicated to portions of said repeater is reversed, and magnetic means secured with said rotatably mounted member adapted for angular movement with said sensitive element whereby said member is actuated for varying the temperature of said resistors and current flow therein in accordance with the angular movement of said sensitive element.

8. In a system for indicating angular motion of a movable element of a sensitive instrument at a remote repeater, a transmitter device comprising a plurality of temperature responsive Wheatstone bridge circuits arranged in parallel and electrically connected with the repeater and having current flow therein, a source of fluid pressure whose temperature differs from that of the normal temperature of said bridge circuits, a rotatably mounted member adjacent said bridge circuits for directing said fluid against opposite arms of some of said bridge circuits during one position of said movable element and for directing said fluid against the remaining arms of said last-named bridge circuits during another position of said movable element whereby current flow communicated to portions of said repeater is reversed, and magnetic means secured with said rotatably mounted member urged for angular movement by said sensitive element whereby said member is actuated for varying the temperature of said bridge circuits and current flow therein in accordance with the angular movement of said sensitive element.

9. In a system for indicating angular motion of a movable element of a sensitive instrument at a remote repeater, a transmitter device comprising a plurality of temperature responsive resistors arranged in parallel and electrically connected with the repeater and having current flow therein, a source of fluid pressure whose temperature differs from the normal temperature of said temperature responsive resistors, a rotatably mounted member adjacent said resistors for directing said fluid against some of said resistors during one position of said movable element and against another of said resistors during another position of said movable element whereby current flow in the effected resistors is varied, and magnetic means secured with said rotatably mounted member adapted for angular movement with said sensitive element whereby said member is actuated for varying the temperature of said resistors and current flow therein in accordance with the angular movement of said sensitive element.

10. A telemetric system for indicating the angular motion of a rotatable element at a remote point, comprising a transmitter including a plurality of temperature responsive resistors angularly spaced about the axis of rotation of said element, a source of current for energizing said resistors to heat them, means for supplying a flow of air toward said resistors to vary their temperatures to thereby vary the current flow therein, means actuated by said rotatable element for controlling the air flow to said resistors to vary the temperature thereof and the current flow therein in accordance with the angular movement of said element, a remote receiver comprising a plurality of coils connected to said resistors and current source whereby a resultant magnetic field is produced by said coils, said field moving angularly in accordance with the angular movement of the rotatable element at the transmitter, rotatable magnet means providing a field which reacts with said resultant field to rotate said magnet means, and indicating means actuated by said magnet means.

11. In a system for indicating angular motion of a rotatable element of a sensitive instrument at a remote repeater, a transmitter device electrically connected with said repeater comprising a circuit having a plurality of temperature responsive resistors therein, a source of electrical current for heating said resistors, means directing a flow of air to vary the temperature of said resistors, air flow control means rotatably mounted adjacent said resistors, and magnetic means operatively connecting said control means for angular movement with said element whereby said control means are actuated for controlling the flow of air to said resistors to vary the temperature of said resistors in accordance with the angular movement of said element.

12. In a system for indicating angular motion of a rotatable element of a sensitive instrument at a remote repeater which comprises a stator and a magnetic rotor associated with the stator, a transmitter device electrically connected with the stator comprising a circuit having a plurality of temperature responsive resistors angularly spaced about the axis of rotation of said element, a source of electrical current for heating said resistors, means directing a flow of air to vary the temperature of said resistors, air flow control means rotatably mounted adjacent said resistors, and magnetic means operatively connecting said control means for angular movement with said element whereby said control means are actuated for controlling the flow of air to said resistors to vary the temperature of said resistors in accordance with the angular movement of said element and thus vary the current flow through said resistors communicated to the repeater stator.

GREGORY V. RYLSKY.